United States Patent [19]

Araghi et al.

[11] 4,450,458

[45] May 22, 1984

[54] MULTI-FUNCTION REPRODUCTION APPARATUS

[75] Inventors: Mehdi N. Araghi, West Webster; Joseph J. Daniele, Pittsford, both of N.Y.

[73] Assignee: Xerox Corporation, Stamford, Conn.

[21] Appl. No.: 394,602

[22] Filed: Jul. 2, 1982

[51] Int. Cl.³ .............................................. G01D 15/14
[52] U.S. Cl. ................................. 346/155; 346/107 R; 346/160; 350/360; 358/293
[58] Field of Search ................... 346/107 R, 155, 160; 350/360; 358/286, 293, 300

[56] References Cited

U.S. PATENT DOCUMENTS 3,746,911  7/1973  Nathanson et al. ............. 315/21 R
4,087,810  5/1978  Hung et al. ..................... 340/324 M
4,317,137  2/1982  Tompkins ....................... 358/293 X

OTHER PUBLICATIONS

IBM TDB (vol. 22, No. 11, Apr. 1980).
IBM TDB (vol. 23, No. 1, Jun. 1980).
IBM TDB (vol. 22, No. 12, May 1980).
IBM TDB (vol. 20, No. 1, Jun. 1977).
IBM TDB (vol. 22, No. 5, Oct. 1979).
IBM TDB (vol. 21, No. 3, Aug. 1978).
"Dynamic Micromechanics on Silicon: Techniques and Devices" (IEEE Transactions, vol. ED-25, No. 10, Oct. 1978).
"Micromechanical Light Modulator Array Fabricated on Silicon" (Applied Physics Letters, vol. 31, No. 8, Oct. 15, 1977).
"The Mirror Matrix Tube: A Novel Light Valve for Projection Displays" (Proceeding of the S.I.D., vol. 16/3, Third Quarter 1975).
"Micromechanical Accelerometer Integrated with MOS Detection Circuitry" (CH1616-2/80/0000-0673, 1980 IEEE).
"Silicon Torsional Scanning Mirror" (IBM J Res. Develop., vol. 24, No. 5, Sep. 1980).
"Silicon as a Mechanical Material" (IEEE Proceedings, vol. 70, No. 5, May 1982).

Primary Examiner—Thomas H. Tarcza
Attorney, Agent, or Firm—Frederick E. McMullen

[57] ABSTRACT

A dual mode reproduction machine or copier incorporating a full width read/write bar having at least one linear array of flexible reflectors selectively bendable in response to the application of electrical potentials thereto, the reflectors reflecting imaging rays either onto an imaging member to expose the same or onto a beam stop in response to an image signal input. A second parallel array of photodetector elements permits a document original to be read line by line, and the document image converted to image signals. Light transmission arrays cooperate with the read/write bar to enable exposure of the imaging member or reading of a document original selectively.

7 Claims, 6 Drawing Figures

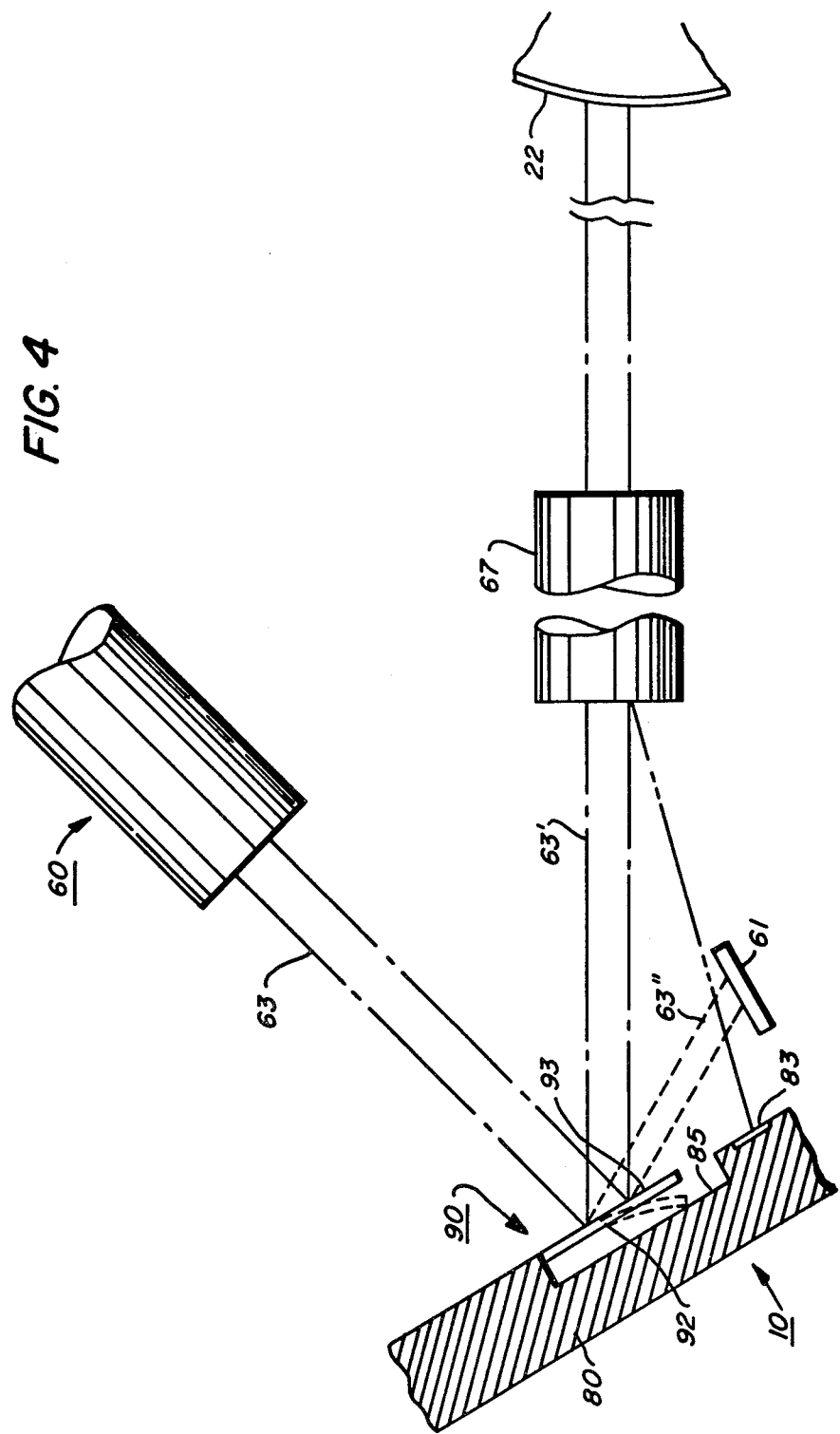

READ

MULTI-FUNCTION REPRODUCTION APPARATUS

The invention relates to a multi-function reproduction apparatus or copier, and more particularly to a full width read/write bar for use in reproduction apparatus or copiers of this type.

Typical reproduction machines or copiers such as a xerographic type copier may be classified as single mode machines in that machines of this type commonly have just one function, to produce copies from document originals. And, while machines of this type may come in a variety of designs, operate at various speeds, and incorporate various and sundry aids such as document handlers, they remain a single mode machine.

Recently, interest has arisen in multi-mode machines, namely, reproduction machines or copiers that in addition to or in lieu of performing the usual copying function are also capable of scanning document originals to read the image thereon and convert the same to image signals or pixels, and/or which are capable of scanning the machine imaging member to write images thereon in response to image signals or pixels input from an outside source. However, attempts to provide machines having additional operating functions or modes such as those alluded to above have been handicapped by the problems of greatly increased expense and complexity, problems which have mitigated against the commercial acceptance of machines of this type. For example, one type of image writing system requires a high intensity beam of light which normally requires the use of a relatively expensive laser. But further, a relatively sophisticated optical system is needed; an optical system which requires in addition to the usual lenses and mirrors, a device such as a rotating polygon to scan the light beam across the machine imaging member, and a modulator such as an acousto-optical type modulator to modulate the beam in accordance with the content of the image signals or pixels. Coupled with this is the need for complex and expensive electronic circuitry for operating the writing mechanism in timed synchronization with the reproduction machine or copier with which it is associated which often requires the use of large amounts of relatively expensive memory.

The invention seeks to provide a simpler, less expensive multimode reproduction apparatus in which a combination read/write full width array is used in a read mode to both scan document originals for the purpose of converting the document image scanned to image signals and in a write mode to expose the apparatus imaging member and create images thereon in response to an image signal input, the array including a substrate; a linear succession of deflectable finger-like reflectors on the substrate interposable in the path of a beam of light, the reflectors being selectively deflected in a pattern commensurate with an image signal input to either reflect light to the image member to expose the member or onto a stop; and a linear succession of photosensors on the substrate opposite and parallel to the reflectors for converting light reflected from the document original being scanned to image signals.

IN THE DRAWINGS

FIG. 4 is an enlarged view in cross section of the read/write bar of the present invention;

Figure 2:
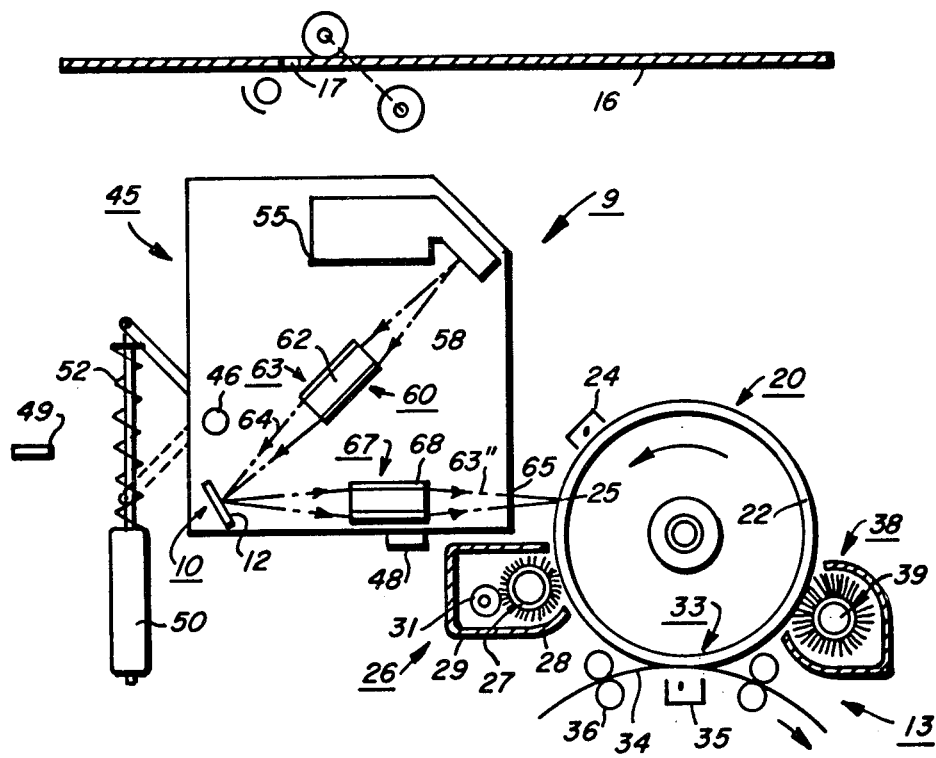
FIG. 2 is a view in cross section showing the apparatus of FIG. 1 in the WRITE mode.
Figure 1:
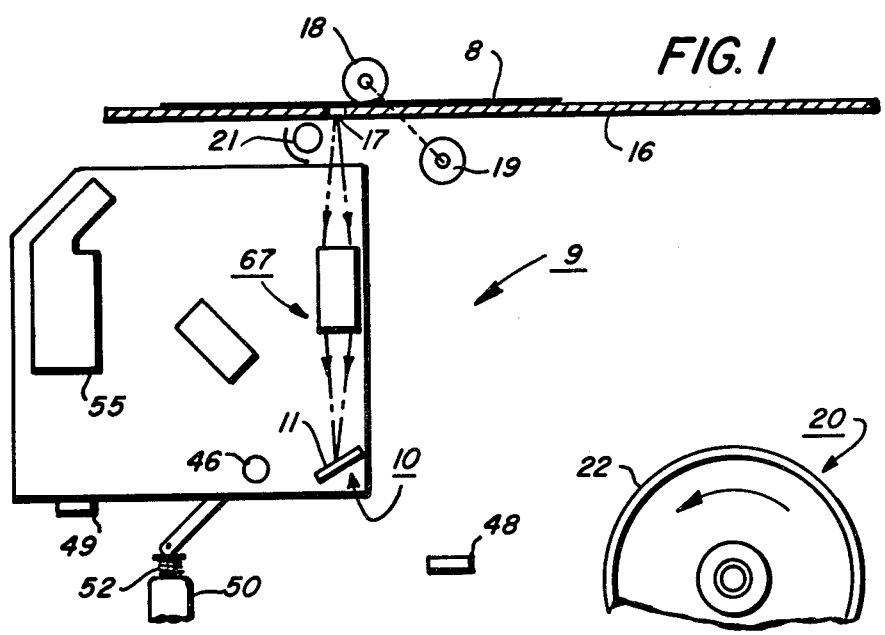
FIG. 1 is a view in cross section showing a multifunction read/write apparatus incorporating the read/write bar of the present invention in the READ mode.

Referring to FIGS. 1 and 2, the multi-function read/write bar of the present invention, designated generally by the numeral 10, is thereshown in a dual function copier or reproduction machine 9 operable as will appear in a READ mode to scan a document original 8 disposed on viewing platen 16 through scanning or viewing aperture 17 and convert the document image to electrical signals, (FIG. 1) and in a WRITE mode to expose the copier imaging member 20 selectively in response to image signals to create an image (FIG. 2). The exemplary copier 9 disclosed includes a xerographic system in which the imaging member 20 comprises a photoconductive drum 22 supported for rotation in a suitable housing or enclosure (not shown). A suitable motor (not shown) rotates drum 22 in the direction shown by the solid line arrow upon actuation of copier 9. A corona charging device such as corotron 24 is disposed in operative relationship with drum 22, corotron 24 serving to place a uniform electrostatic charge on photoconductive drum 22 preparatory to exposure thereof.

Photoconductive drum 22 is exposed at an exposure station 25 downstream of corotron 24 in a manner to be more fully described hereinbelow, such exposure creating a latent electrostatic image on the surface of photoconductive drum 22. Following exposure, the latent electrostatic image on photoconductive drum 22 is developed by a suitable developer 26 illustrated herein as a magnetic brush developing roll 27. Magnetic brush developing roll 27 is rotatably disposed at a suitable developer housing 28, the lower portion of which forms a sump or reservoir 29 for a supply of developer material. A suitable developer loading device illustrated herein as a donor roll 31 serves to draw developer from sump 29 and load the same onto developing roll 27, the magnetic forces generated by suitable magnets internal of developing roll 27 (not shown) serving to attract and hold at least a portion of the developer material on the exterior surface of developing roll 27. As will be understood by those skilled in the xerographic arts, developer material may comprise a mixture of relatively large carrier beads and relatively smaller toner or ink particles, the toner adhering to and being carried on the relatively larger carrier beads through electrostatic forces. On disposition of developer material into operative relationship with photoconductive drum 22, toner is attracted to the latent electrostatic image on photoconductive drum 22 from developing roll 27 in proportion to the electrostatic forces created to render the latent electrostatic image on drum 22 visible.

Following developing of the latent electrostatic image, the developed image is carried by photoconductive drum 22 to transfer station 33 whereat the developed image is transferred from photoconductive drum 22 to a suitable copy substrate material shown here as a sheet 34 of copy paper brought forward by a suitable copy sheet feeder 36 in timed relation to arrival of the developed image on photoconductive drum 22 at transfer station 33. To facilitate transfer, a transfer corotron 35 is disposed opposite photoconductive drum 22 at transfer station 33. The copy sheet 34 bearing the developed image is carried to a suitable fusing or fixing device (not shown) where the toner image is permanently adhered to the copy sheet 34. A cleaning station 38 downstream of transfer station 33 serves to remove any leftover developing material prior to making the next image. In the exemplary apparatus shown, cleaning station 38 incorporates a cleaning brush 39.

A two position read/write housing 45 is rotatably supported by suitable pivot means 46 for operative disposition with platen 16 and photoconductive drum 22. Stops 48, 49, which are preferably adjustable to facilitate alignment of housing 45 with platen 16 and photoconductive drum 22 in both the Read and Write positions, are provided, stops 48, 49 cooperating with the housing proper to limit rotation of housing 45 in either a clockwise or counterclockwise direction. A suitable drive means illustrated herein as solenoid 50 is provided for moving housing 45 from the Read position shown in FIG. 1 to the Write position shown in FIG. 2. Spring means 52 may be provided to return housing 45 to the Read position of FIG. 1.

Read/Write bar 10, which as will appear has parallel reading and writing arrays 11, 12 respectively, (shown in FIG. 3), is suitably supported in predetermined fixed position in housing 45 such that reading array 11 of bar 10 may view scan aperture 17 in platen 16 and the portion of the image of the document 8 thereover when housing 45 is disposed in the Read position or writing array 12 of bar 10 may scan photoreceptor 20 when housing 45 is disposed in the Write position. A suitable source of high intensity light such as a tungsten halogen lamp 55 is mounted in housing 45 in predetermined spaced relation to Read/Write bar 10, lamp 55 generating a line or sheet like beam 58 of light. Beam 58 is of a width sufficient to permit line by line exposure of photoconductive drum 22 as will appear.

A linear array 60 of light transmitting optic fibers 62 is disposed between lamp 55 and Read/Write bar 10, optic fibers 62 being bundled together in succession to produce a line-like beam of light 63 which is composed of the succession of individual light beams 64 emitted by fibers 62 of light transmitting array 60. The overall width of beam 63 is at least equal to the width of the writing array 12 of Read/Write bar 10. Preferably, the number of optic fibers 62 that comprise light transmitting array 60 is equal to the number of reflectors that comprise the writing array 12 of Read/Write bar 10 which in turn is determinative of the image writing resolution of bar 10 as will be understood.

A slit-like opening 65 is provided in the side of housing 45, opening 65 being aligned with Read/Write bar 10 and having a dimension sufficient to permit image rays to be transmitted to and from Read/Write bar 10. An image transmission member 67 is suitably mounted in housing 45 in the optical path between Read/Write bar 10 and aperture 65, member 67 preferably comprising a plurality of lens fibers 68 bundled together in succession to focus and transmit an image line from scanning aperture 17 and the document image portion thereover to reading array 11 of bar 10 (READ Mode) or from writing array 12 to photoconductive drum 22 at exposure station 25 (WRITE Mode). The width dimension of the image line transmitted by member 67 is equal to the overall width of the reading and writing arrays 11, 12 respectively of Read/Write bar 10 while the number of lens fibers 68 that comprise member 67 is preferably equal to the number of reading and writing elements that comprise reading and writing arrays 11, 12.

A suitable document feeder illustrated herein as document feeder roll 18 is provided for advancing the document 8 to be scanned across scanning aperture 17 in platen 16. Feeder roll 18 is operated by a suitable drive motor 19. An illumination lamp 21 is disposed below platen 16 and adjacent scanning aperture 17 to illuminate the portion of document 8 opposite aperture 17.

Figure 3:
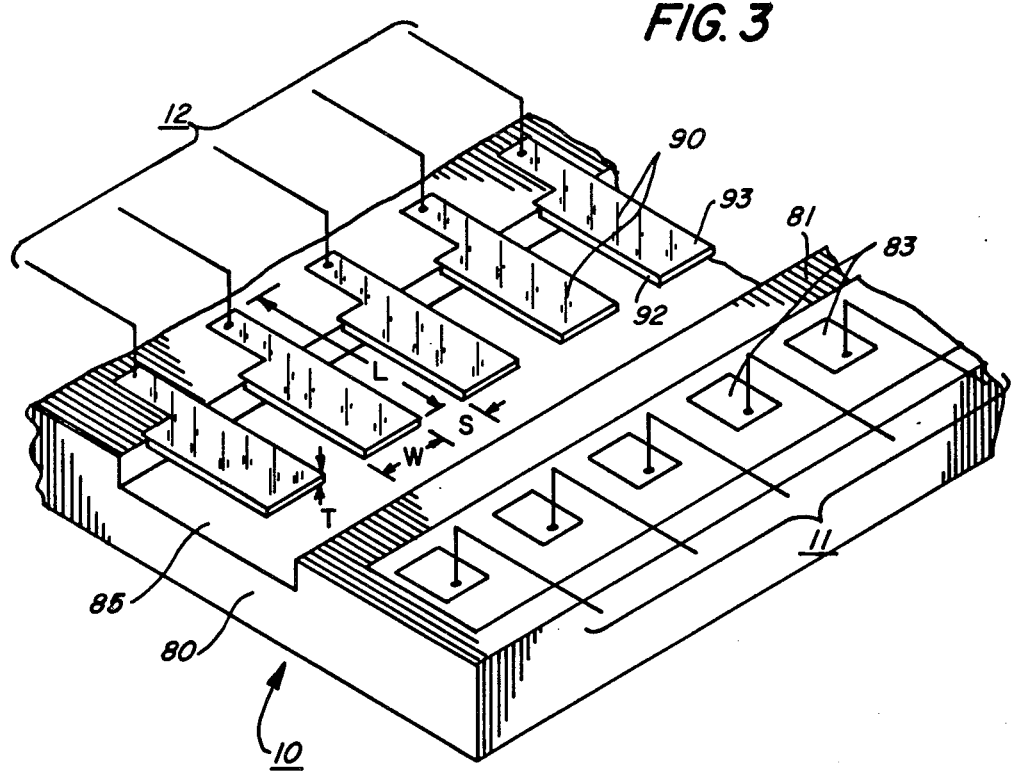
FIG. 3 is an enlarged isometric view illustrating details of the read/write bar of the present invention.

Referring particularly to FIGS. 3 and 4 of the drawings, Read/Write bar 10 includes a generally rectangular substrate or base 80, the longitudinal dimension of which is greater than the width of the largest area to be read or written on, i.e. scanning aperture 17 or photoconductive drum 22. Reading array 11, which extends along one side 81 of substrate 80, is composed of a succession of light detector elements 83 which may for example comprise photosites integrated onto substrate 80, the number and size of light detector elements 83 being equal to the image resolution desired. And while a single array 11 of light detector elements 83 is disclosed herein, multiple arrays with either parallel or staggered light detector elements may be envisioned.

Substrate 80 is recessed at 85, the recessed area 85 forming a longitudinally extending depression or valley between reading and writing arrays 11, 12. Writing array 12 comprises a succession of finger like reflectors 90 which consist of flexible wafers or membranes mounted on substrate 80 at one end such that the remainder of each reflector projects outwardly in cantilever fashion above the recessed area 85. As will appear, reflectors 90 bend or arc on imposition of an electrical potential thereacross, recessed area 85 permitting such bending or arcing.

Reflectors 90 preferably comprise a relatively thin flexible insulating base 92 which may for example comprise silicone dioxide with a flexible conductive layer 93 of highly reflective material which may for example comprise chromium thereover. Light striking the reflectors 90 when in an undeflected condition is reflected as zero order beam 63'. A writing array 12 having reflectors 90 with a length (L) of 100 um, a width (W) of 50 um and a thickness (T) of 0.25 um, the reflectors 90 being spaced apart by a distance (S) of 5 um may be envisioned. As will be understood, the overall width (W) of writing array 12 is at least equal to the maximum width of the image to be produced. For example, where an 8½ by 11 inch image is to be processed, the length of writing array 12 would be at least 8½ inches. The number of reflectors 90 is chosen to provide the image resolution desired. Preferably, the number and disposition of reflectors 90 is the same as light detector elements 83 of reading array 11.

Reflectors 90 respond to the imposition of a voltage thereacross, the resulting electrostatic force causing the reflector 90 to which the voltage is applied to bend or deflect downwardly (as shown by the dotted lines in FIG. 4). The degree of bending or deflection obtained is dependent upon the voltage applied, and has been found to increase with increases in voltage up to a predetermined maximum. Typically, a maximum deflection of approximately 5° may be realized by the application of approximately 15 volts, the bending frequency of the cantilevered reflectors 90 being approximately 23 kHz. As a result, the direction in which the light from light transmitting array 60 are reflected by reflectors 90 may be controlled by controlling the voltage applied to the individual membranes 90 of writing array 12. Light striking the reflectors 90 when in a deflected state condition is reflected as first order beam 63" herein.

Figure 5A:
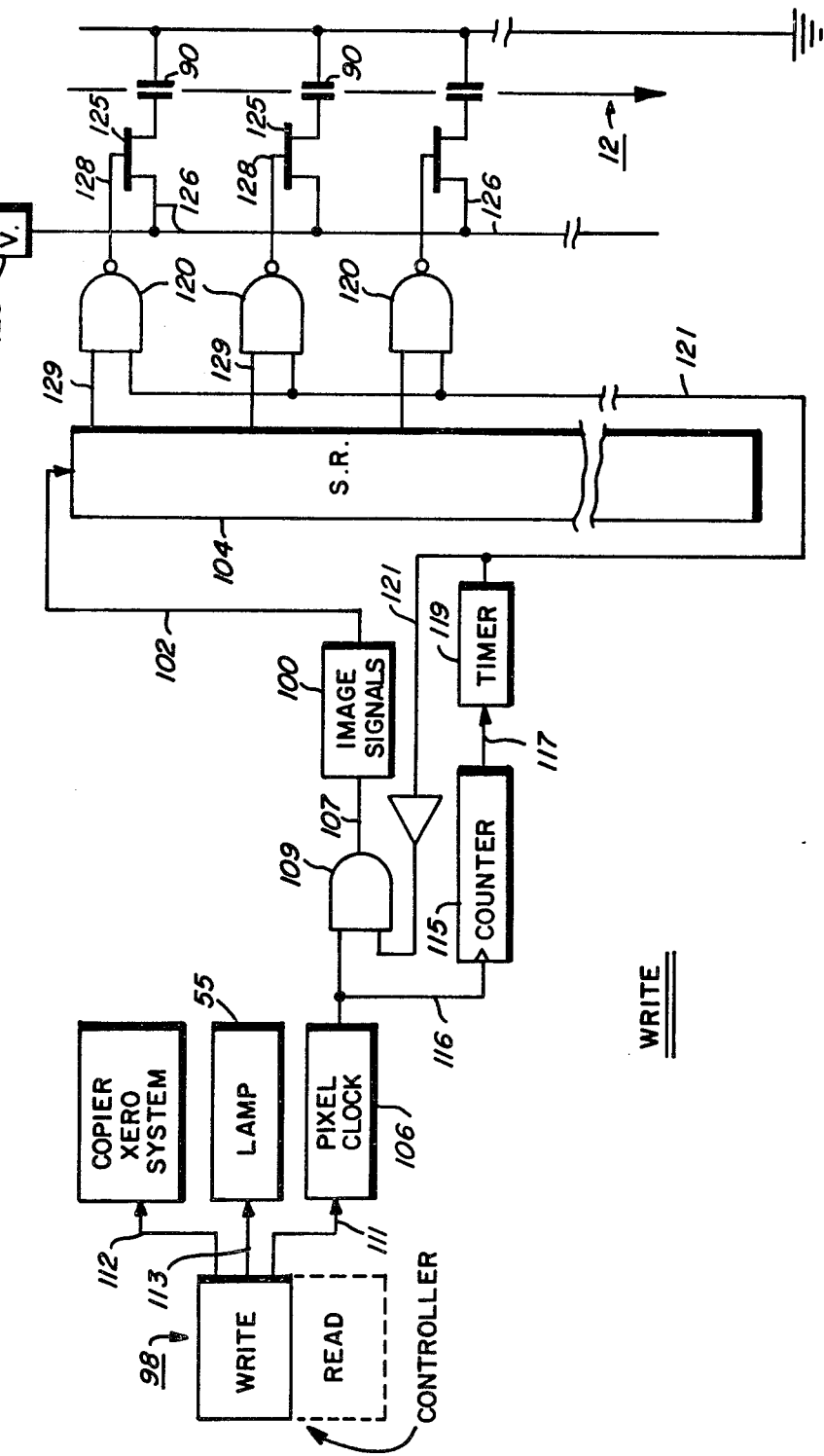
FIG. 5a is a logic schematic of the WRITE mode control system for the apparatus shown in FIG. 1.

Referring to FIG. 5a, a suitable control module 98 is provided for operating copier 9 in either the READ or WRITE mode. For operation in the WRITE mode, a suitable image signal source 100 provides image signals for operating writing array 12 of Read/Write bar 10, the output side of image signal source 100 being coupled by line 102 to a serial to parallel shift register 104. As will be understood, image signal source 100 may comprise any suitable source of image signals such as a memory, communication channel, raster input scanner, etc. A suitable pixel clock 106 is provided for clocking the image signal output of image signal source 100 to shift regiater 104, the output of pixel clock 106 being coupled to image signal source 100 by clock line 107 through AND function gate 109. Actuation of clock 106 is controlled by the control signal from control module 98 through lead 111.

Control module 98 regulates energization of the copier xerographic system and lamp 55 through leads 112 and 113 respectively. To control loading of image signals from image signal source 100 into shift register 104, a suitable counter 115 is provided, counter 115 being driven by the clock pulse output of pixel clock 106 through clock line 116. The output of counter 115 is coupled by line 117 to the input terminal of a suitable exposure interval timer 119. The output side of timer 119 is coupled to one input of AND function exposure control gates 120 and to a second input of gate 109 through line 121.

A suitable deflecting voltage source 123 is provided for deflecting reflectors 90, voltage source 123 being normally coupled to the individual reflectors 90 through control gates 125 and lines 126. Base 80 of Read/Write bar 10 is grounded. The control terminals of individual gates 125 are coupled to the output sides of exposure control gates 120 through lines 128. The individual output stages of shift register 104, which equal the number of reflectors 90 which in turn equal the number of image signals that comprise an image line, are coupled by lines 129 to a second input of exposure control gates 120.

Figure 5B:
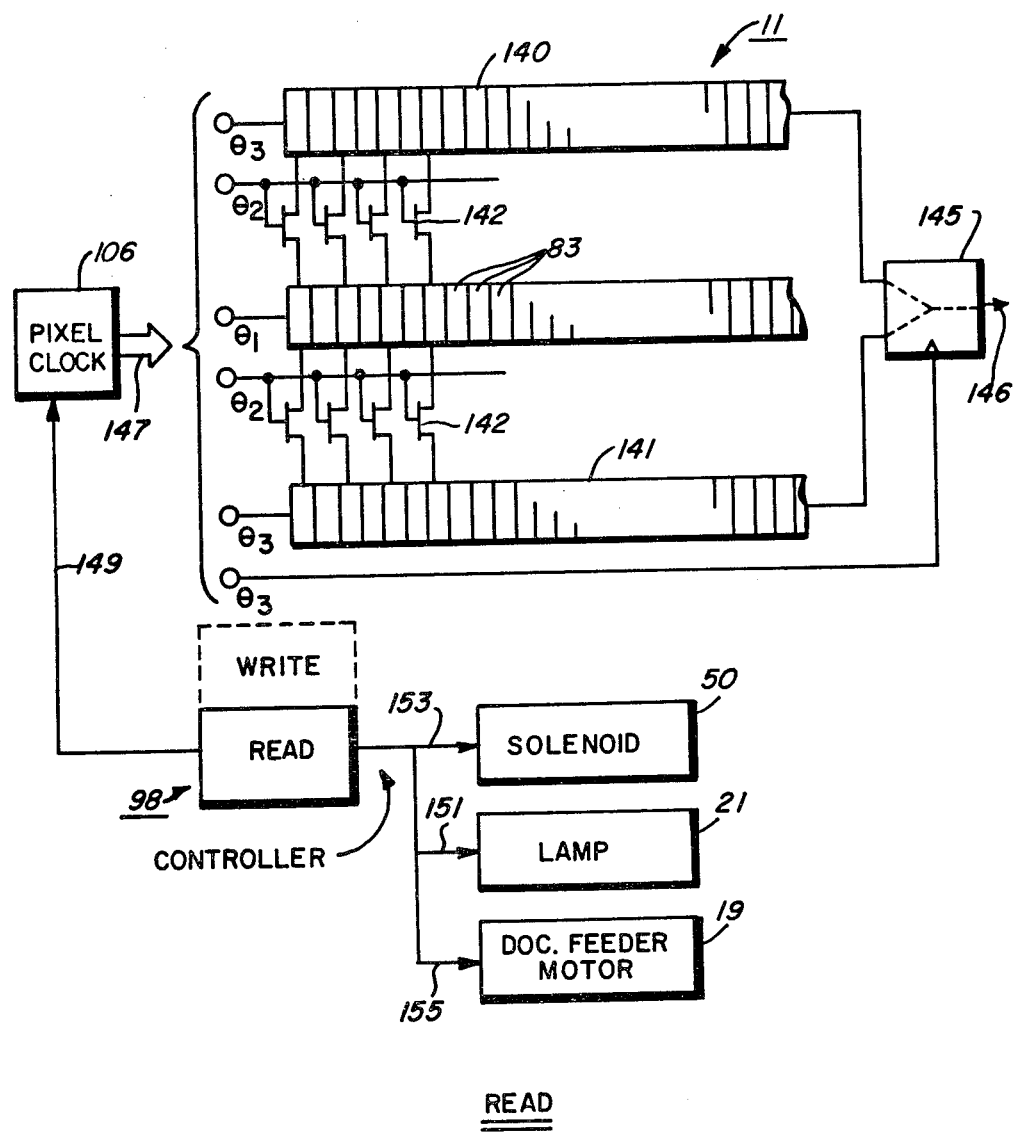
FIG. 5b is a logic schematic of the READ mode control system for the apparatus of FIG. 1.

Referring to FIG. 5b, for operation in the READ mode, a pair of parallel in to serial out shift registers 140, 141 are provided for receiving the analog signal output (the voltage of which is representative of the image gray level) of alternate light detector elements 83, a transfer gate 142 being provided for each detector element 83 to transfer the analog signal output to the shift register stage associated therewith. A control gate 145, the inputs of which are coupled to the serial outputs of shift registers 140, 141, serves to combine the odd/even image signal outputs of registers 140, 141 into a serial stream which is passed to output line 146. As will be understood, the image signals generated may be output to any suitable user such as memory, communication channel, printer, etc.

Preferably, shift registers 140, 141, transfer gates 142, control gate 145, and the associated wiring are integrated onto the substrate 80 of Read/Write bar 10.

Reading array 11 is operated in predetermined timed intervals through an Integration Cycle, Transfer Cycle, and Signal Output Cycle by clock pulses signals $\theta_1$, $\theta_2$ and $\theta_3$ from pixel clock 106. The clock output of pixel clock 106 is coupled to the inputs of reading array 11 by clock bus 147. Pixel clock 106 is coupled to the output of control module 98 by read signal line 149. The output of control module 98 is coupled by lines 151, 153, and 155 to the operating terminals of document exposure lamp 21, solenoid 50, and drive motor 19 for document feeder roll 18.

Operation

For operation in the WRITE mode, a signal from control module 98 actuates copier 9 thereby initiating movement of photoconductive drum 22 past exposure station 25. A signal from control module 98 energizes lamp 55. The deflection voltage from voltage source 123 is applied across the array of reflectors 90 that comprise writing array 12 through control gates 125, gates 125 being normally actuated to the closed state for this purpose.

The application of a deflection voltage to the individual reflectors 90 that comprise writing array 12 generates an electrostatic force which causes the reflectors 90 to bend or curve downwardly as shown by the dotted lines in FIG. 4. As a result, the beam of light 63 emitted by light transmitting array 60 (which is composed of plural individual beams 64) is reflected in total by the array of reflectors 90 as a first order beam 63", the beam 35 impinging against beam stop 61.

A signal from control module 98 triggers pixel clock 106 to output via gate 109 a stream of pixel clock pulses for clocking the image signal output of image signal source 100. Conveniently, the pixel clock pulse rate may correspond to the pixel clock pulse rate $\theta_3$ employed to shift image signals from reading array 11 during operation in the READ mode. The clock signals output by clock 106 load shift register 104 with image signals from the image signal source 100, the image signals passing successively through the shift register stages. At the same time, the clock signals from clock 106 toll a count on counter 115. On reaching a count equal to the number of image signals in a line, a signal from counter 115 triggers timer 119 to apply an enabling signal to image signal distributing gates 120 for a preset exposure interval. Concurrently, the signal output of timer 119 disables gate 109 to temporarily end the input of clock pulses to image signal source 100.

Where the current image signal at the individual shift register stages is relatively low (i.e. a binary 0), the control gate 125 associated therewith remains in a closed state. As a result, the deflection voltage from voltage source 123 continues to be applied to the reflectors 90 coupled thereto and the reflectors remain in the arced position shown by the dotted lines of FIG. 4. Accordingly, light striking any reflectors 90 in this condition remains as a first order beam 63" and impinges against beam stop 61.

Where the image signal at the output of the individual shift register stages is relatively high, (i.e. a binary 1), the control gate 125 associated therewith is triggered to interrupt the application of deflection voltage from voltage source 123 to the reflector 90 associated therewith. With the termination of the electrostatic force, the affected reflector springs back to the straight or level position shown by the solid lines of FIG. 4. Light impinging against any undeflected reflectors 90 is reflected along the zero beam path 63' and through image transmission member 67 to exposure station 25 and photoconductive drum 22. The momentary application of light to drum 22 at exposure station 25 exposes the photoconductive surface with the result that a latent image is created line by line in accordance with the image signal content.

Following a preset exposure, interval timer 119 resets to disable the distribution gates 120, again permitting application of the deflection voltage from voltage source 123 to the array of reflectors 90. As a result, the beam of light 63 emitted by light transmitting array 60 is again reflected as the first order beam 63″ against beam stop 61. The foregoing process is repeated for subsequent image lines until writing of the image is completed. As will be understood by those familiar with the xerographic arts, the latent electrostatic image formed on photoconductive drum 22 in this operational mode is developed at developing station 26 and thereafter transferred to copy sheet 39 at transfer station 33.

For operation in the READ mode, control module 98 is set to the READ position. A signal from control module 98 energizes solenoid 50 which rotates housing 45 against the bias imposed by spring means 52 to the read position shown in FIG. 1 of the drawings, stop 49 limiting movement of housing 45 to a predetermined amount. Illumination lamp 21 is energized to illuminate scanning slit 17 and the portion of the document 8 thereover while drive motor 19 is energized to operate document feeder roll 18 to move the document 8 on platen 16 forward. It is understood that the document 8 to be scanned is previously inserted into the nip formed between feeder roll 18 and platen 16.

A signal from control module 98 triggers pixel clock 106 to operate reading array 11 of Read/Write bar 10, the light detector elements 83 viewing the scanning aperture 17 and the portion of the document 8 thereover line by line as the document is advanced across scanning aperture 17 by document feeder roll 18. During each read cycle, light detector elements 83 view or read the document line for a predetermined Integration period $\theta_1$, following which the analog signals on the detectors 83 are transferred to shift registers 140, 141 by a transfer pulse $\theta_2$. The transferred signals are thereafter clocked from shift registers 140, 141 in serial stream to output line 146.

The foregoing process is repeated for each document line as document 8 is advanced past scanning aperture 17 by feeder roll 18. When reading of the document 8 is completed, operation in the READ Mode is terminated and the machine 9 shutdown.

It will be understood that the aforedescribed logic control system is exemplary only and other systems for operating copier 9 and Read/Write bar 10 in either READ or WRITE modes may instead be envisioned. And while light reflected by reflectors 90 of Read/Write bar 10 when in an undeflected condition (i.e. zero order beam 63′) is illustrated as comprising the exposure beam for exposing photoconductive drum 22, reflected light from reflectors 90 when in a deflected condition may instead be used to expose the imaging member.

While the invention has been described with reference to the structure disclosed, it is not confined to the details set forth, but is intended to cover such modifications or changes as may come within the scope of the following claims.

We claim:

1. A combined read/write micro-deflector array comprising:
   (a) a substrate;
   (b) a linear succession of bendable reflecting fingers on said substrate interposable in the path of a sheet of light, said fingers being selectively deflected in a pattern commensurate with a line of image signals applied thereto to either reflect light along a first image producing path or along a second path to a stop; and
   (c) a linear succession of photosensors on said substrate opposite and parallel to said fingers for converting image rays striking said photosensors to image signals.

2. The array recited in claim 1 in which:
   said substrate includes a recessed area extending between said linear succession of reflecting fingers and said linear succession of photosensors,
   each of said reflecting fingers being supported on said substrate so that at least a portion of each of said reflecting fingers extends above said substrate recessed area, said substrate recessed area permitting said reflecting fingers to deflect.

3. A combination image reading and writing bar for use with raster scanning apparatus of the type having a viewing station where a document original may be read and converted to electrical signals, and an imaging member on which an image may be written in response to image signals, comprising in combination:
   (a) a generally rectangular substrate, the length of said substrate being sufficient to permit said substrate to span across said apparatus viewing station and imaging member;
   (b) at least one writing array of flexible reflector elements on said substrate interposable into the path of a plurality of light rays, there being one light ray associated with each of said reflector elements whereby said reflector elements reflect said light rays along a first path, said reflector elements deflecting in response to application of a predetermined signal to reflect said light rays along a second path; and
   (c) at least one reading array of light detector elements on said substrate parallel to and spaced from said writing array to detect image rays from a document at said viewing station and convert said image rays to electrical signals.

4. In an apparatus selectively operable to either read or write images having a viewing station for viewing an image bearing document to be read, an imaging member on which images are written in accordance with an image signal input, and means for processing images written on said imaging member to provide copies, the improvement comprising:
   (a) a generally rectangular substrate;
   (b) means forming at least one linear writing array of deflectable reflector elements on said substrate, the linear extent of said writing array being sufficient to permit said writing array to span said imaging member, said writing array reflector elements selectively reflecting light striking each of said reflector elements along a first path when said reflector elements are undeflected or along a second path when said reflector elements are deflected;
   (c) control means for selectively deflecting said reflector elements in response to said image signal input;
   (d) means forming at least one linear reading array of light detector elements on said substrate parallel to and spaced from said writing array to detect image rays from a document at said viewing station and convert said image rays to electrical signals, the linear extent of said reading array being sufficient to permit said reading array to span said viewing station; and (e) means supporting said substrate for movement between a first position where the portion of said light beam reflected by said writing array reflector elements along one of said first and second paths in response to said image signal input impinge on said imaging member, and a second position where said reading array light detector elements view said viewing station and the document thereat.

5. The apparatus according to claim 4 including means for transmitting said image rays from the document at said viewing station and said light rays reflected from said writing array reflector elements along said one path to and from said reading and writing arrays respectively.

6. The apparatus according to claim 5 in which said transmitting means comprises a plurality of lens elements, there being one lens element for each pair of said writing array deflector elements and said reading array detector elements.

7. The apparatus according to claim 6 including a light source, and a plurality of light transmitting elements between said light source and said writing array reflector elements, there being one light transmitting element associated with each of said writing array reflector elements.

* * * * *